July 6, 1937.  J. B. ARMITAGE  2,085,888

MACHINE TOOL TRANSMISSION AND CONTROL

Filed Nov. 23, 1932   8 Sheets-Sheet 2

INVENTOR
Joseph B Armitage
BY
Fred G Parsons
ATTORNEY

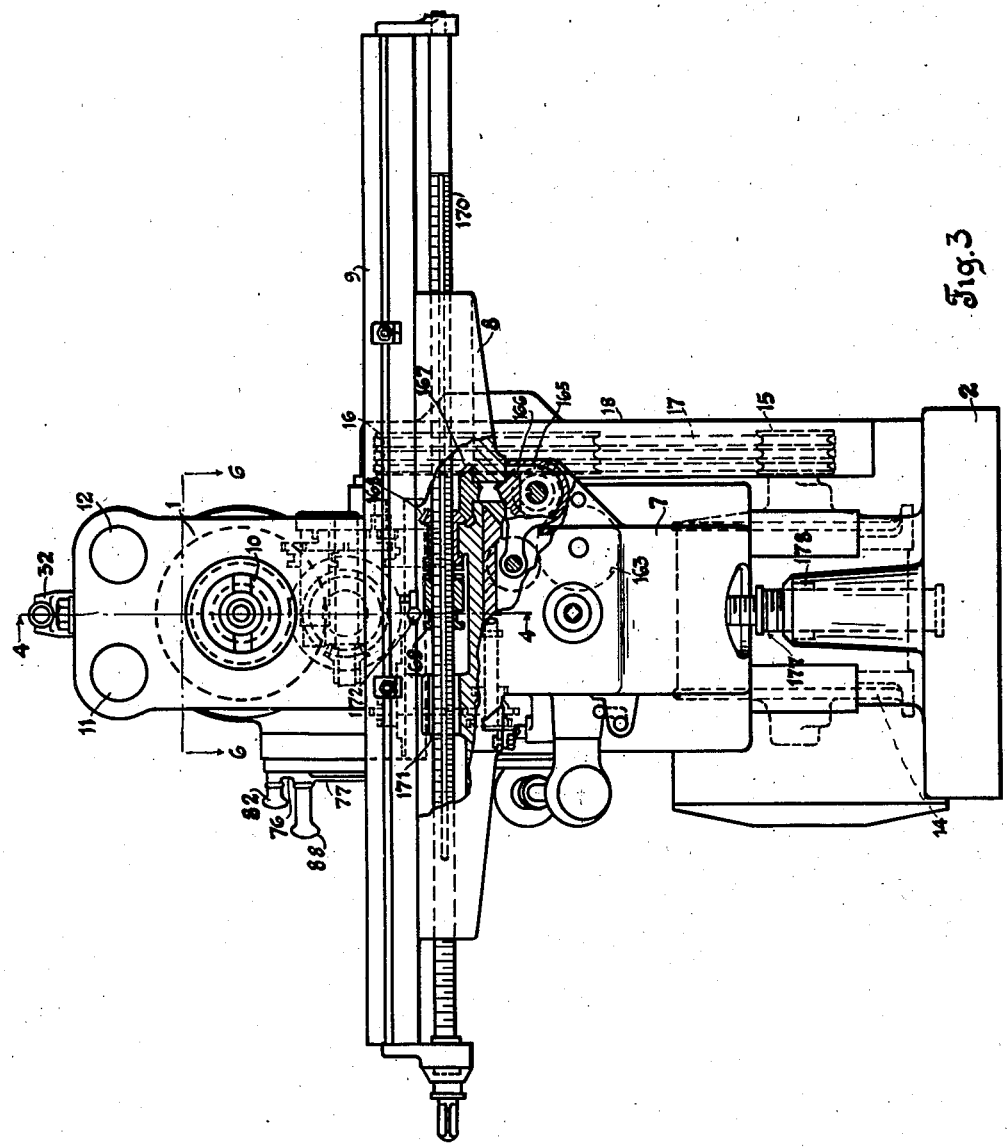

July 6, 1937.  J. B. ARMITAGE  2,085,888

MACHINE TOOL TRANSMISSION AND CONTROL

Filed Nov. 23, 1932  8 Sheets-Sheet 4

INVENTOR
Joseph B Armitage
BY
Fred A Parsons
ATTORNEY

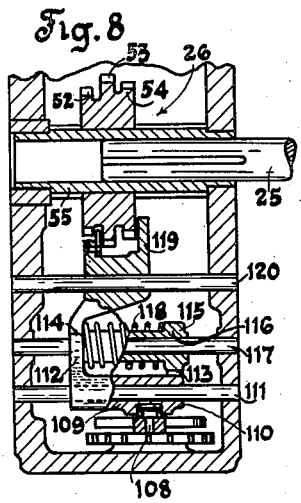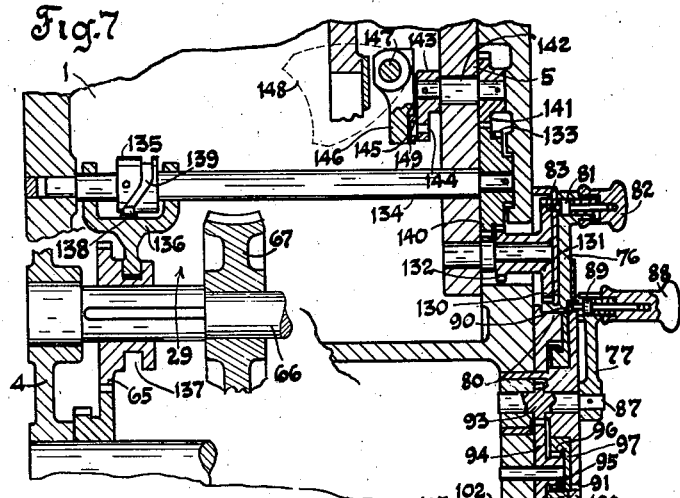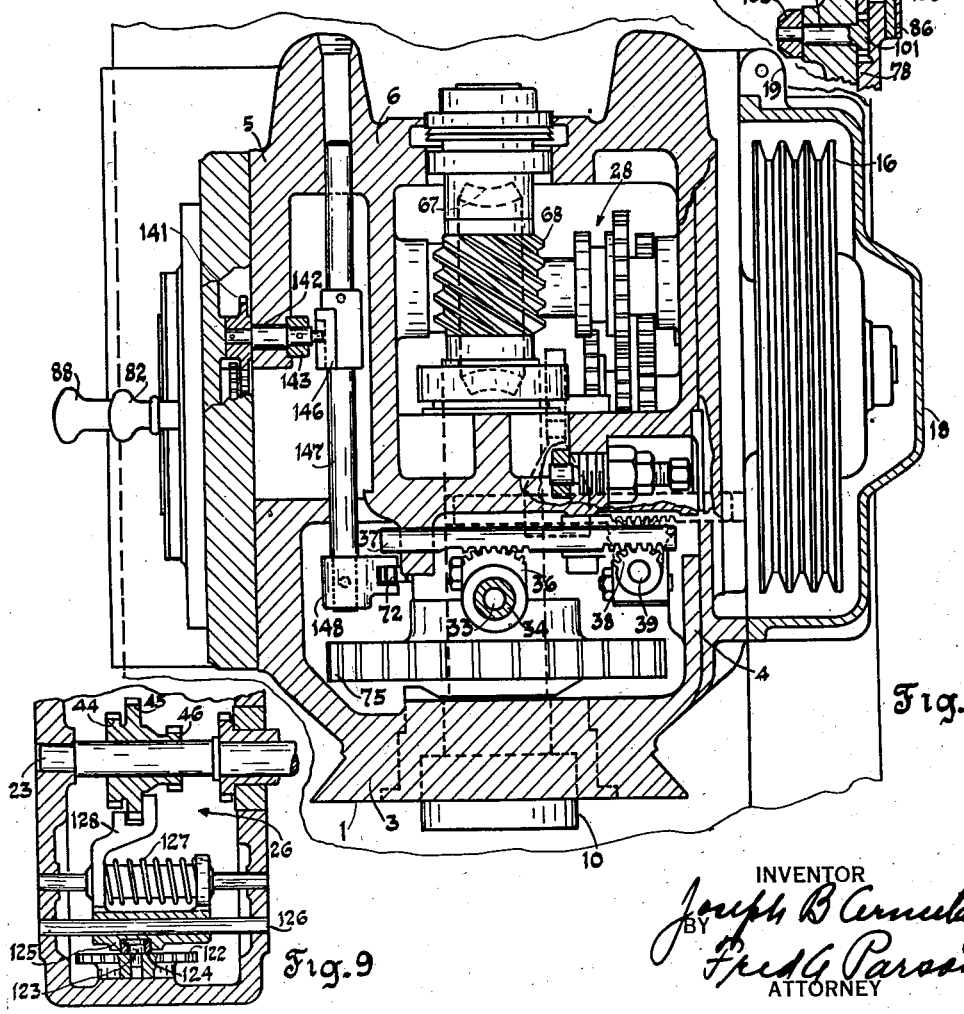

Patented July 6, 1937

2,085,888

UNITED STATES PATENT OFFICE 2,085,888

MACHINE TOOL TRANSMISSION AND CONTROL

Joseph B. Armitage, Wauwatosa, Wis., assignor to Kearney & Trecker Corporation, West Allis, Wis.

Application November 23, 1932, Serial No. 644,040

15 Claims. (Cl. 90—18)

This invention relates generally to transmission and control mechanism for machine tools, and more particularly to the tool spindle drive of a milling machine.

A primary object of the invention is to provide improved rate changing means, more especially such means providing a relatively high ratio between the slowest and fastest rates available therefrom, and with a relatively large number of intermediate rates in preferred sequence.

A further object is to provide such rate change means in a form adapted for the peculiar requirements of milling machines and particularly the type of milling machine commonly known as the knee type or knee and column type.

Another object is to provide rate change means such as mentioned above in an improved relationship with other drive mechanism and structure of a knee type milling machine.

A further object is to provide a plurality of normally independently operable rate change devices each arranged to modify the rate effect of the other, with rate indicating means operating to show the combined rate effect of the different devices in any position of adjustment of either device.

Other objects are generally to improve and simplify the construction and operation of transmission mechanism, particularly for milling machine tool spindles, and still other objects will be apparent from the specification and claims.

The invention consists in the construction, arrangement, and combination of parts as herein illustrated, described and claimed and in such modification thereof as is equivalent to the claims.

Fig. 3 is a view in front elevation of the machine partly in section.

Fig. 6 is an enlarged view in horizontal section on the line 6—6 of Fig. 3.

Figs. 7 to 12 inclusive are views partly in section showing details of the spindle gear train and gear shifting mechanism.

Figure 1:
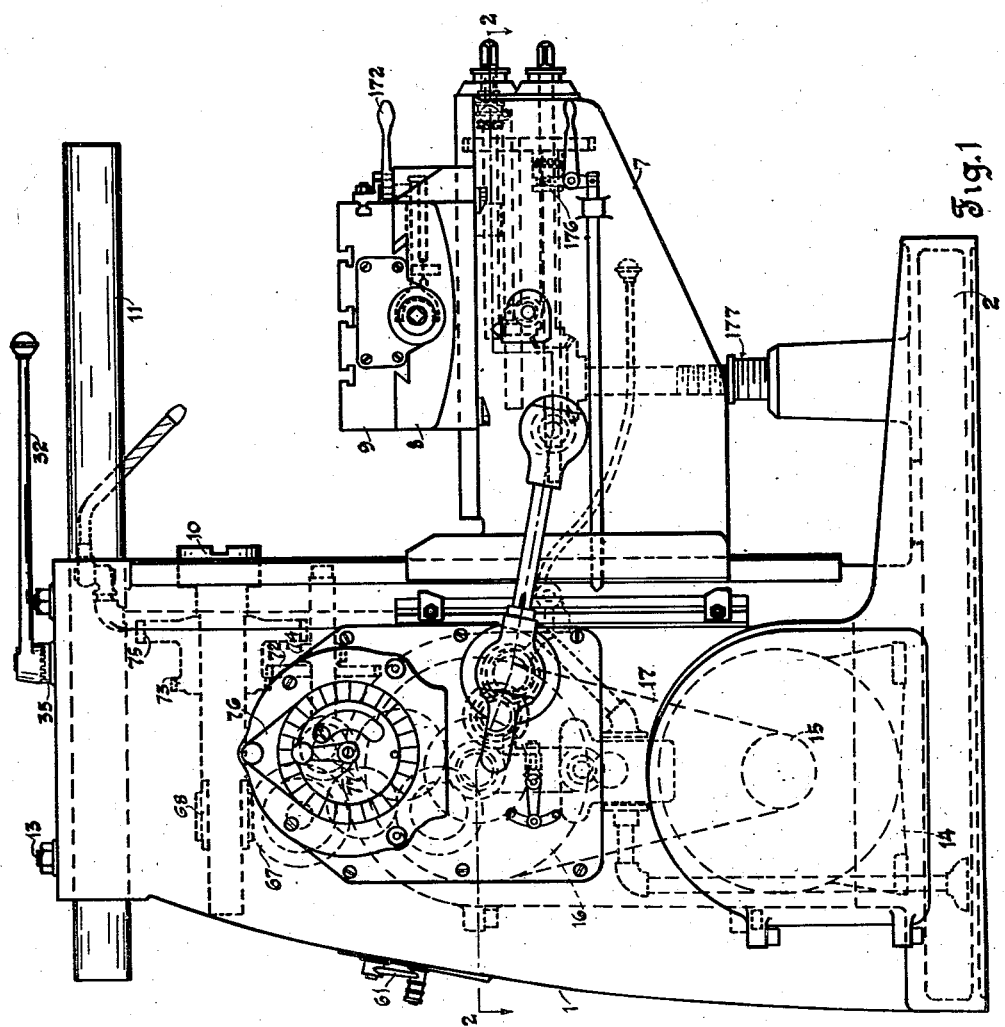
Fig. 1 is a view in left side elevation of a milling machine of the knee and column type incorporating the invention.
Figure 13:
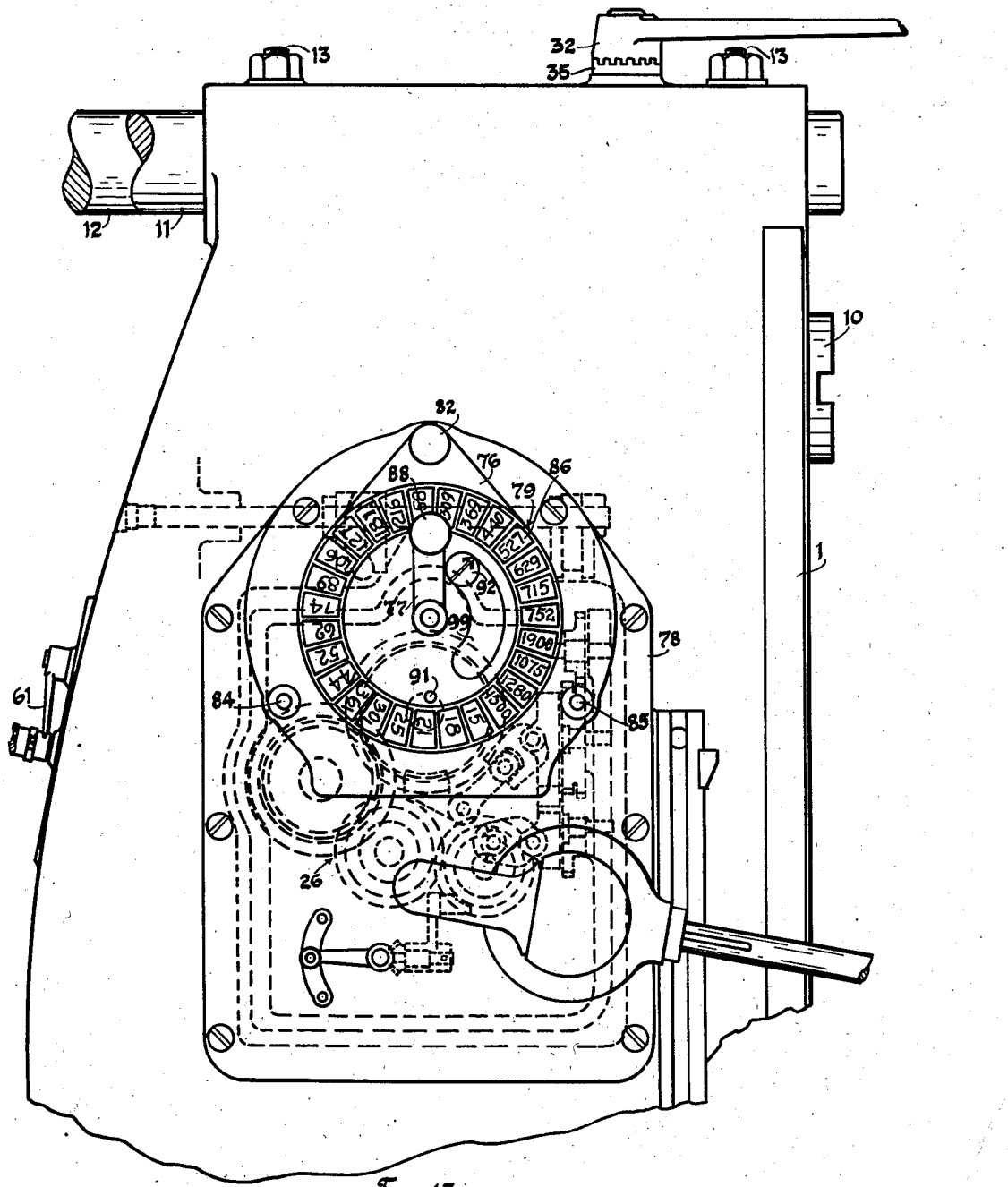

Fig. 13 is a view in side elevation of a portion of the machine shown in Fig. 1, enlarged.

The machine shown in the drawings includes a hollow column 1 having a base 2, a front face or wall 3, side walls 4 and 5 and a rear wall 6. A knee 7 is mounted for vertical movement adjacent to the front face or wall 3 and carries a crosswise movable saddle 8 upon which is mounted a longitudinally movable work table 9. At the upper part of the column 1 is mounted a rotatable tool spindle 10. Overarms 11, 12 are mounted in the column above the spindle for movement parallel to the spindle axis and may be clamped in adjusted positions by means of bolts 13—13. A driving motor 14 provides a power source for the machine and is housed within the column at a level underneath spindle 10 and in a separate motor chamber as more particularly described in Patent 1,938,661, issued December 12, 1933.

The motor 14 has a pulley 15, which may be of the multiple groove or other well known type, keyed on the motor shaft and which drives a pulley 16 through flexible driving belts 17. The pulleys 15 and 16 are disposed outside of the column wall but are entirely enclosed by a cover or housing member 18 which is hinged on one edge as shown at 19 so that the pulleys can be exposed for inspection or replacement of the belts 17. The motor 14 is adjustably mounted for altering the tension of belts 17 as disclosed in said Patent No. 1,938,661.

Figure 5:
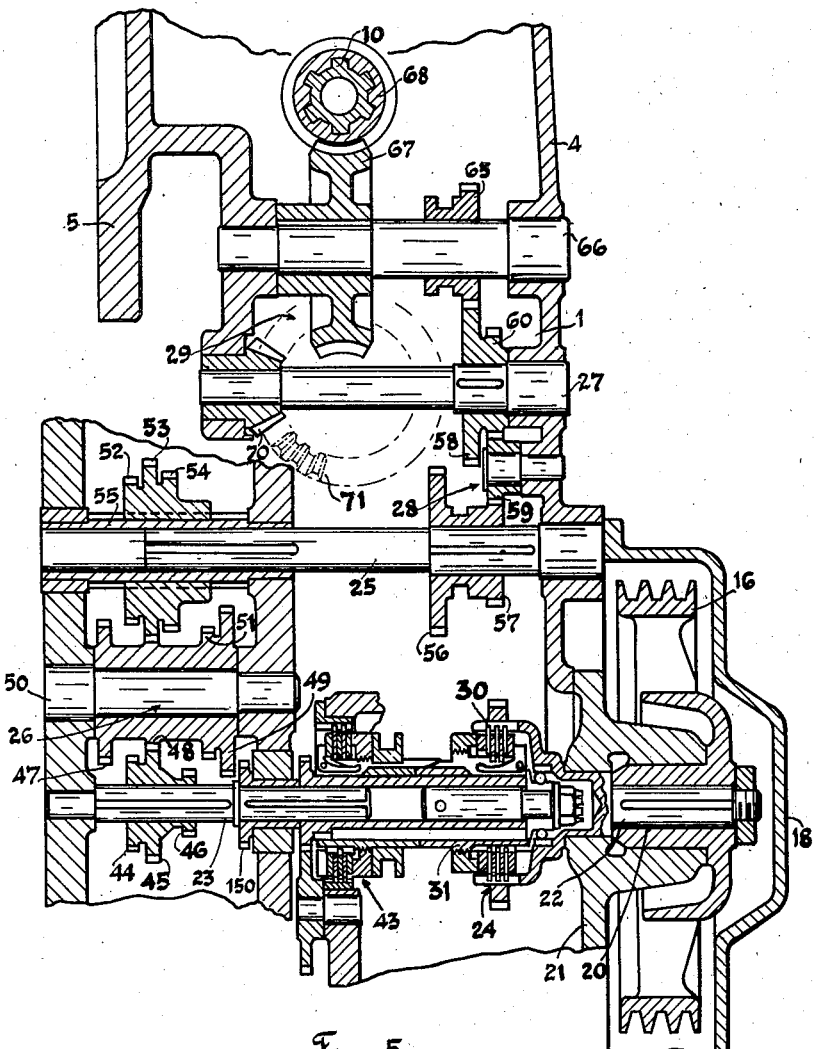
Fig. 5 is a developed sectional view showing parts of the transmission mechanism.
Figure 11:
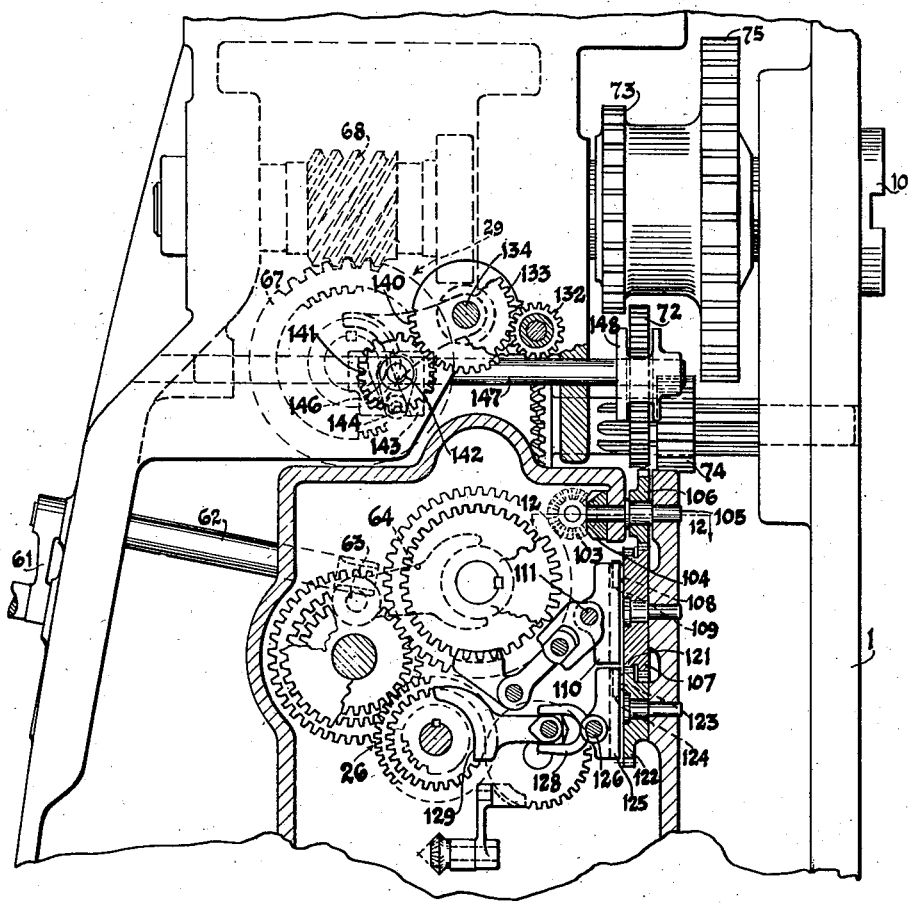
Figure 12:
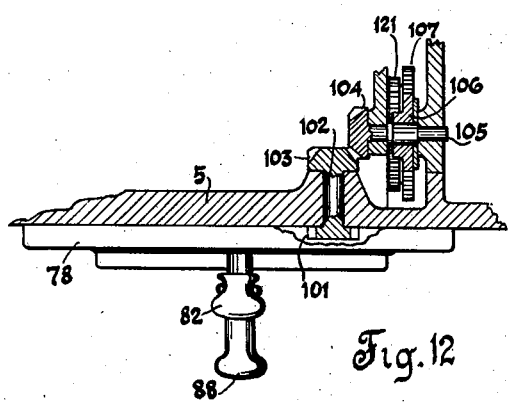

The hub of pulley 16 is journaled in a bearing 20, Fig. 5, formed integrally with a plate 21 which is bolted or otherwise fastened to the side wall 4 of the column, and the hub is fixed to a shaft 22, Fig. 5, axially parallel to the shaft of the motor and which drives a shaft 23 through a motion interrupting clutch generally designated as 24. The shaft 23 drives a shaft 25 through a first or primary rate changer, generally designated as 26. The shaft 25 drives a shaft 27 in either direction through a reverser generally designated as 28. The shaft 27 drives the spindle 10 through a second or supplementary rate changer generally designated by the numeral 29. The spindle transmission mechanism is also disclosed in a copending application, Serial No. 643,580, filed November 21, 1932 which has matured into Patent No. 2,008,983, dated July 23, 1935.

Figure 4:
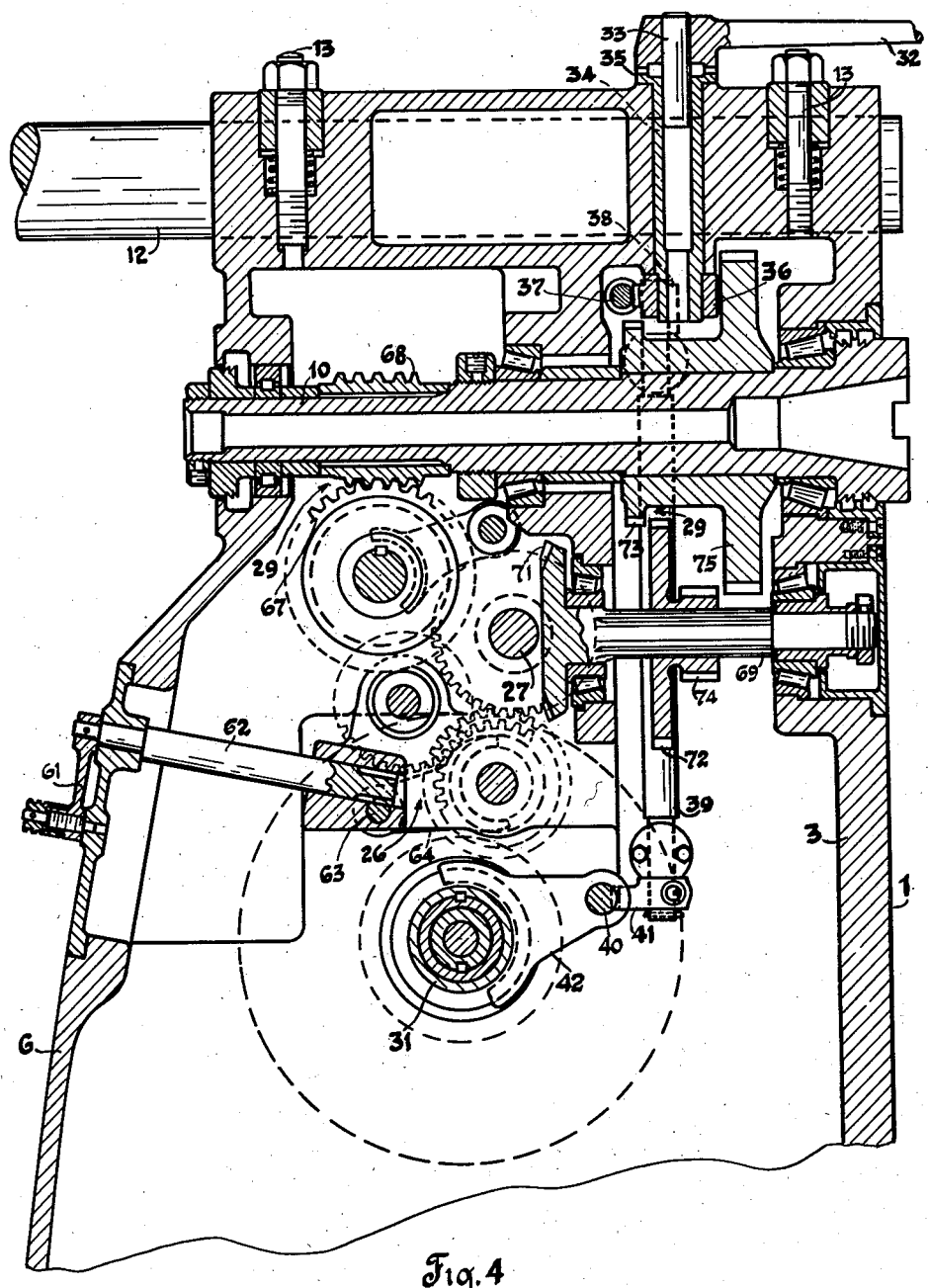
Fig. 4 is an enlarged view in vertical section taken on the line 4—4 of Fig. 3 showing portions of the spindle gear train in the upper part of the column of the machine.

The clutch 24, Fig. 5, may be of any type suitable for interrupting and establishing a driving connection between shaft 22 and shaft 23, but, as here shown, is of a type generally known as a multiple plate clutch in which a series of friction elements 30 are alternately engaged or disengaged by the axial shifting of an annular sleeve or member 31. Member 31 is manually shifted by a hand lever 32, Fig. 4, located upon the upper end of the machine. The lever 32 is fixed to a vertical shaft 33 which operates a sleeve 34 through a jaw clutch 35. The lower end of sleeve 34 has fixed thereto a gear segment 36, shown in Fig. 6, which operates a rack bar 37. The rack bar 37 engages a segment 38 fixed on a shaft 39, which extends downward and operates a rack bar 40, Fig. 4, through a segment 41. The bar 40 carries a fork 42 engaging a suitable annular groove in the sleeve 31 to move it in either direction.

The movement of sleeve 31 in direction to disengage clutch 24, when continued, engages a brake generally designated by the numeral 43. Brake 43 may be of any suitable form and will, therefore, not be described in detail.

The first or primary rate changer 26 is constructed as follows: Gears 44, 45, 46, Fig. 5, are slidably keyed to the shaft 23 and fixed together for unitary axial movement for engagement one at a time respectively with complementary gears 47, 48, and 49, which are fixed together and rotatably supported on a shaft 50. Another gear 51 is also fixed with gears 47, 48, 49, and the gears 47, 48, 51 are engageable, one at a time, by gears 52, 53, 54 respectively complementary thereto, the gears last mentioned being fixed together and slidably keyed on a sleeve 55 in driving engagement with the shaft 25. The arrangement is such that the various positions of the shiftable gears provide nine changes of rate between the driving shaft 23 and the driven shaft 25, and since the difference in gear diameters is relatively small, the rate changes effected form a series having relatively small increments.

The reverser 28 is constructed and operated as follows: Slidably keyed on shaft 25, Fig. 5, is a unitary pair of gears 56, 57. In the one position of axial adjustment of the gear pair the gear 56 engages a gear 58 fixed on shaft 27. In another position of axial adjustment the gear 57 engages an idler 59 which drives a gear 60 fixed on shaft 27. The gear pair 56, 57 may be shifted to the one or the other position by the means of a hand lever 61, Fig. 4, mounted on the back wall 6 and fixed on a shaft 62 having gear teeth engaging a rack bar 63 upon which is fixed a fork member 64 which engages a suitable annular groove in the hub of the gear pair.

The second or supplementary rate changer 29 is constructed as follows: A gear 65 is slidably keyed to a shaft 66 and is shiftable into and out of engagement with the gear 58 fixed on shaft 27, Fig. 5, whereby to connect or disconnect a high speed train consisting of shaft 66, a helical or worm gear 67 fixed on shaft 66 and a complementary helical pinion or worm 68 fixed on the spindle 10. Two other power trains are driven from a shaft 69, Fig. 4, which is driven from the shaft 27 by the means of a bevel gear 70, Fig. 5, engaging a bevel bear 71, Fig. 4. The two trains just referred to consist respectively of the gear 72 slidably splined on shaft 69 and engageable with gear 73 fixed on spindle 10 to form a train of intermediate speed; and a gear 74 slidably splined on shaft 69 and engageable with a gear 75 fixed on spindle 10 to form a low speed train. The gears 72, 74 are fixed together for unitary movement and arranged to be engageable one at a time. The difference in diameter of the gears is sufficient that the increments of rate change effected are larger than the total rate change of the first rate changer. The combined effect of the mechanism described is to give three separate power trains of different rate effect from the shaft 27 to the spindle 10, which in combination with the first rate changer provides twenty-seven changes of spindle speed.

For positioning the various shiftable elements of the rate changers 26, 29 there is provided a speed control mechanism or shifting device, which will now be described. The rate control mechanism is operable from a plurality of pivoted levers or arms 76, 77, Fig. 7, carried by a plate or member 78 which is removably attached to the side wall 5 of the column 1 and which also carries a speed indicating device generally denoted by the numeral 79, Fig. 13. The lever 76 is mounted for rotation on a shoulder 80, Fig. 7, of the plate 78 and is provided with a spring pressed plunger 81 and a handle or grip 82 at its outer end. The plunger 81 is fixed in the handle 82 and is adapted to engage with locating holes 83, 84, 85, shown in Figs. 7 and 13. Fixed with the arm 76 is a dial 86 giving the numerical values of the various spindle speeds to be had as a result of shifting the elements of rate changers 26, 29 when the power source consisting of motor 14 is driven at a predetermined constant speed.

The lever 77 is fixed with a shaft 87 rotatably supported from the fixed plate 78, and has a handle 88 and a spring pressed plunger 89 fixed to the handle 88 and adapted to engage with locating holes 90 and 91, in a cover plate 100, Figs. 7 and 13.

The lever 77 controls the position of a movable speed indicating arrow or index 92, Fig. 13, through mechanism as follows: Fixed with the shaft 87 is a spur gear 93 engaging a gear 94 with which is fixed a gear 95 which engages a gear 96 on a pivoted plate 97. The plate 97 has fixed thereto the indicating arrow 92 shown in Fig. 13 which projects into an arcuate slot 99 cut in the cover plate 100. The ratio of the gears 93, 94, 95, 96 is such that rotating the lever 77 from the one to the other of the locating holes 90, 91 moves the arrow 92 from the one speed as indicated on the dial 86 to the next adjacent speed.

The lever 77 also controls the rate effect of the various shiftable elements in the rate changer 26 through mechanism as follows: Gear 94, movable from lever 77, as previously described, engages a gear 101 fixed on a shaft 102, Fig. 7, upon which is also fixed a bevel gear 103, Figs. 7, 10, 11, 12. Bevel gear 103 engages a bevel gear 104 fixed on a shaft 105 upon which is also fixed a gear 106 engaging a gear 107. Fixed with gear 107 and eccentrically disposed relative to the gear axis is a pin 108 which carries a roller 109 engaging with a slot or groove in a movable member 110 slidably guided on a rod 111. Member 110 has forked end portions 112, 113, Fig. 8, which are fitted over shoulders or hubs 114, 115 of a member 116 slidably guided on a rod 117. The forked ends 112, 113 and the shoulders 114, 115 provide abutments for the opposite ends of a spring 118 retained thereby and which serves to resiliently establish a predetermined relative position between the members 110, 116. Member 116 has fixed therewith a fork 119 guided on a rod 120 and engaging side faces of the gears 53, 54. The arrangement is such that a movement of lever 77 from the one to the other of the locating holes 90, 91 moves the gear 107 through one-third of a revolution and eccentric pin 108 a sufficient distance for the gears 52, 53, 54 to be moved out of one engaged position into another. Also when the arrow 92 is in the position at the upper end of the arcuate slot, the gear 53, Fig. 5, is engaged to bring about the relatively slow one of the rate changes effected by the shifting of the gears 52, 53, 54. Then a movement of lever 77 which will move the arrow 92 downwardly to the next speed indicating position for the next higher speed will move the gears 52, 53, 54 to engage the gear 54 and a still further movement to the next speed indicating position will engage the gear 52. Further movement of lever 77 to move the arrow 92 through the nine positions which are permitted by slot 99 repeats the three positions of gears 52, 53, 54 just described but in addition brings about movements of the gears 44, 45, 46, as will now be described.

During the above described movements the gears 44, 45, 46 have remained in a position engaging the gear 46, whereby to bring about the slowest one of the three rate changes effected by the shifting of these gears. The gear 107 of the shifter train for transmission gears 52, 53, 54 has fixed therewith an intermittent gear 121 engaging with an intermittent gear 122 upon which is fixed an eccentric pin 123 which carries a roller 124 engaging a slot or groove in a movable member 125 guided on a rod 126 which shifts the gears 44, 45, 46 through a spring 127, Fig. 9, and fork member 128 similar to the shifter previously described for the gears 52, 53, 54. The intermittent gears 121, 122 are such shape and proportions that gear 122 remains stationary during the previously described movements of gear 107 and, as before stated, during such time the gear 46 has been engaged, but during the next succeeding movement of gear 107 whereby to shift gears 52, 53, 54 from the position engaging gear 52 to a position engaging gear 53, the intermittent gearing acts to also shift gears 44, 45, 46 to a position engaging the gear 44 which is productive of the next higher rate effect. This position of gears 44, 45, 46 is maintained during subsequent movements of lever 77 while the arrow 92 is moved through the next three speed indicating positions, that is to say, the fourth, fifth, and sixth positions of the series of nine speeds indicated by the arrow. During the next subsequent movement of lever 77, whereby to move arrow 92 from the sixth to the seventh speed indicating position, the intermittent gear 122 is again moved whereby to move the gears 44, 45, 46 from the position engaging gear 44 to a position engaging the gear 45 productive of the highest rate effect, which position is maintained during movements of lever 77 to move arrow 92 through the positions indicating the last three rates of the series of nine rates.

The above described rate change movements of lever 77 are obviously reversible in effect and the position of the arrow 92 at any time in either direction of its movement indicates the rate effective on shaft 25 from the rate changer 26 provided pulley 16 is driven at a predetermined constant rate. It will be noted that the movement of shifter member 110, Fig. 8, is transmitted to fork member 119 only through spring 118 which permits the member 119 to lag behind the member 110 in either direction of shift, but continuously urges member 119 to assume the position corresponding to the member 110. Such construction is for the purpose of permitting lever 77 to be moved from the one to the other of its positions irrespective of the blocking of the engagement of the transmission gears 52, 53, 54 which may occur if the teeth strike the mating gear in certain positions. But if such blocking should momentarily occur, the movement of the revolution of the one or the other of the mating gears will shortly permit engagement and the springs will bring it about as soon as it becomes possible. Similarly for the gears 44, 45, 46 the shifter construction also permits the lever 77 to be shifted irrespective of blocking and renders certain that gear engagement will take place as soon as the blocking condition is relieved.

The lever 76 controls the rate effect of the various shiftable elements in the rate changer 29 through mechanism as follows: The lever 76, as previously noted, rotates on a bearing provided by shoulder 80, Fig. 7, on plate 78 and is held in place by the plate 100. Fixed with lever 76 is a gear 130 which engages with a gear 131, and fixed with gear 131 is a gear 132 engaging a gear 133 fixed on a shaft 134 upon which is also fixed a cam 135 which during rotation of shaft 134 shifts the transmission gear 65, Figs. 7, 5, into and out of engagement with its driving gear by the means of a member 136, Fig. 7, which has a fork portion engaging an annular groove 137 in the hub of gear 65 and also carries a cam follower pin 138 engaging the cam groove 139 in cam 135. The construction is such that when lever 76 is positioned for plunger 81, Fig. 7, to engage such a one of the locating holes 83, 84, 85, as will position index chart 86 to permit the movement of arrow 92 to pass over the nine highest speeds of the twenty-seven indicated speeds, then the transmission gear 65 will be engaged whereby the high speed train of the rate changer 29 is operative to drive spindle 10.

For engaging the intermediate and low speed trains of rate changer 29, lever 76 is connected to shift the gears 72, 74 as follows: The shaft 134, Fig. 7, which is movable from lever 76, as previously described, has fixed therewith an intermittent gear 140, Figs. 6, 7 and 11, engaging an intermittent gear 141 fixed on a shaft 142, Figs. 6, 7, upon which is also fixed a member 143 carrying an eccentric pin 144 having a shoe 145 engaging a slot or groove in a member 146 fixed on a rod 147 upon which is also fixed a fork member 148 engaging the side faces of gear 72. The arrangement is such that movement of lever 76, from the high speed position previously described to a position where the index chart 86 positions the intermediate series of nine speeds to read against the various positions of arrow 92, will shift the gears 72, 74 to engage gear 72 to drive the spindle 10, and a movement of lever 76 to a position such that the lowest series of nine speeds is readable against the various positions of arrow 92 will engage gear 74 to drive spindle 10.

It will be noted that the eccentric 144 must retain the transmission gears 72, 74 both disengaged when transmission gear 65 is engaged, otherwise two different speed trains of rate change 29 would be engaged simultaneously. This is accomplished by constructing the intermittent gears to position the eccentric 144 to disengage both gears 72, 74 and dwell in such position during all the period when cam 135 is positioned to move gear 65 into and out of its disengaged position.

It will also be noted that the distance traveled in the movement of transmission gears 72, 74 out of disengaged position is greater for engagement of gear 74 than for gear 72, yet it is desirable that the eccentric pin 144 should stand in the central position of its movement when gears 72, 74 are both disengaged. This could be accomplished by providing an otherwise unnecessary amount of movement to engage gear 72 whereby both engaging movements would be equal, but it is preferable to suitably slant or curve the slot 149, Fig. 7, of the member 146 whereby the effect of moving the eccentric through half its movement in one direction is less than the effect in the other direction.

Figure 2:
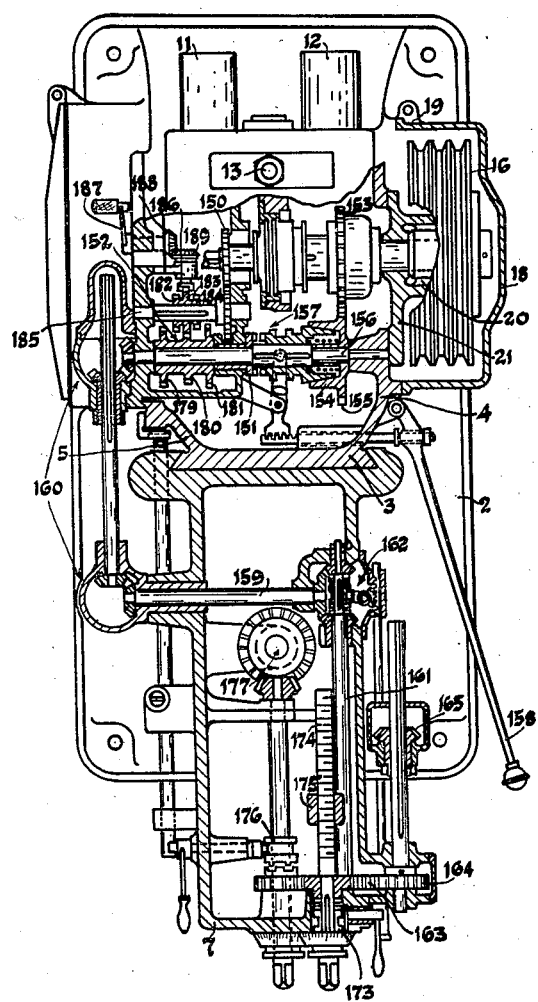
Fig. 2 is a view in horizontal section of the machine illustrated in Fig. 1, taken along the line 2—2 of Fig. 1.
Figure 10:
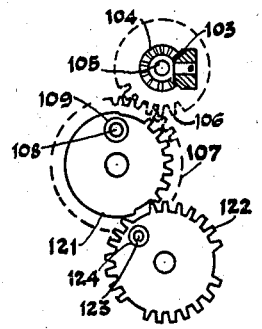

Power means is provided to drive the table 9, the knee 7, and the saddle 8 in either direction of their movement and at a feed or quick traverse rate. The mechanism here shown for the purpose is of simplified form and is to be considered merely as typical of a variety of transmissions which might be used. A feed train originates in a gear 150, Figs. 2, 5, driven through the clutch 24 and drives a feed train terminal element 151, Fig. 2, through a rate changer generally denoted by the numeral 152. A quick traverse train originates in a gear 153 driven independently of the clutch 24 and drives a quick traverse train terminal element 154 through the gear 155. A shaft 156 may be alternatively driven from the one or the other of the terminal elements 151, 154, selection being made through a shiftable clutch device generally designated by the numeral 157 which is operable from a lever 158. The shaft 156 drives a shaft 159 carried by the vertically movable knee through mechanism generally designated as 160, which permits of relative movement of the shafts. The shaft 159 drives a shaft 161 in either direction through a reverser generally designated by the numeral 162. A gear 163 on shaft 161, Figs. 2, 3, meshes with a gear 164 to drive the table through gears 165, 166, 167, 168 and a clutch 169 which is keyed to a screw 170 and may drive the table 9 through a nut 171 fixed in the saddle, the clutch being thrown into and out of engagement by a hand lever 172, Figs. 1, 3. Shaft 161, Fig. 2, may also drive the saddle through a clutch generally denoted by the numeral 173, a screw 174 and a nut 175. Shaft 161 may also drive the knee through a clutch 176, a vertical screw generally designated by the numeral 177 and a nut 178, Figs. 1, 2, 3. The feed rate changer 152, Fig. 2, may be of any convenient form but as here shown comprises three gears 179, 180, 181 fixed together for engagement one at a time with complementary gears 182, 183, and 184, which are rotatably mounted for unitary axial movement on the shaft 185. The shifting device for the feed rate changer comprises a fork mechanism 186 embracing the gear 183 on opposite sides and actuated by a lever 187 through a plurality of bevel gears 188, 189 and connecting shafts.

What is claimed is:

1. In a milling machine, an upstanding column, a tool spindle rotatably supported from said column, work support means comprising a knee, a saddle and a table supported from said column for unitary vertical movement and collectively providing table movement in three mutually transverse paths including a horizontal path transverse to the axis of said spindle, a spindle transmission including a first rate changer operable for a number of rate changes of relatively slight difference in rate, a second rate changer driven through said first rate changer and operable for a number of rate changes of relatively large difference in rate, said rate changers being combinedly operable for a series of spindle speeds including a high rate, a low rate and a plurality of intermediate rates, a rate indicating device including a circular chart rotatably mounted on said upstanding column and providing indices corresponding to said spindle speeds and an indicator pivotally mounted concentric with and relatively movable angularly adjacent to said chart, a plurality of adjusting elements rotatably mounted on said column and respectively connected for operation of different of said rate changers, and motion transmitting connections operatively associating said adjusting elements with said chart and said indicator respectively for effecting relative movement of said chart and said indicator to indicate on said chart the spindle speed resulting from the combined effect of said rate changers.

2. In a milling machine, an upstanding column, a tool spindle rotatably supported from said column, work support means comprising a knee, a saddle and a table supported from said column for unitary vertical movement and collectively providing table movement in three mutually transverse paths including a horizontal path transverse to the axis of said spindle, a spindle transmission including a first rate changer operable for a number of rate changes of relatively slight difference in rate, a second rate changer driven through said first rate changer and operable for a number of rate changes of relatively large difference in rate, said rate changers being combinedly operable for a series of spindle speeds including a high rate, a low rate and a series of intermediate rates, a rate indicating device including a circular rotatably mounted chart providing indices corresponding to said spindle speeds and arranged in order corresponding to the numerical value of said speeds and an indicator pivotally mounted concentric with and relatively movable adjacent to said chart, a plurality of manually operable levers respectively operable for the adjustment of different of said rate changers and each operable independently of the other, and motion transmitting connections from each of said levers for movement of said chart and said indicator respectively in accordance with the rate change effected by movement of the individual lever.

3. In a milling machine, an upstanding column, a tool spindle rotatably supported from said column, work support means comprising a knee, a saddle and a table supported from said column for unitary vertical movement and collectively providing table movement in three mutually transverse paths including a horizontal path transverse to the axis of said spindle, a spindle transmission including a first rate changer adjustable for nine changes of rate of relatively slight rate difference, a second rate changer driven through said first rate changer and adjustable for three changes of rate each of greater rate change effect than the total rate change effect of said first rate changer, said rate changers being combinedly operable for twenty-seven rate changes providing a series of spindle speeds of relatively large total range, a rate indicating device including a rotatably mounted chart providing indices corresponding to said twenty-seven spindle speeds and an indicator pivotally mounted concentric with and relatively movable adjacent to said chart, independent adjusting elements respectively connected for operation of said first and second rate changers, and a motion transmitting connection from said first rate changer adjusting element for movement of said indicator relative to said chart through nine positions and a motion transmitting connection from said second rate change adjusting element for movement of said chart relative to said indicator through three positions to present any one of three groups of indices in cooperating relation with said movable indicator.

4. In a milling machine having an upstanding column, a tool spindle rotatably supported by said column, and work supporting means including a knee supported on said column for vertical movement, a saddle supported on said knee, and a table supported on said saddle for movement in a horizontal path transverse to the axis of said spindle; the combination with a spindle driving transmission mechanism including a rate changer adjustable to effect nine speed rates having relatively small successive differences in speed, a range changer disposed in series relation with said rate changer and adjustable to effect three speed ranges each of greater speed change effect than the total speed change effect of said rate changer, said speed changers being effective in combination to provide a series of twenty-seven different spindle speeds; of a speed selecting and indicating apparatus comprising a rotatable chart presenting indicia arranged in consecutive numerical sequence and representing the twenty-seven spindle speeds effected by said transmission, an indicator arranged concentrically with said chart in manner to be movable in cooperating relationship with nine indicia constituting one of three sectors of said chart, a rate control member operative to effect adjustment of said rate changer and to correspondingly move said indicator relative to said chart sector and a range control member operative to effect adjustment of said range changer and to move said chart to present to said indicator the sector thereof corresponding with the adjustment of said range changer, whereby said indicator in cooperating with said chart will indicate thereon the speed at which the spindle will operate as the result of the combined adjustment of said rate changer and said range changer.

5. In a milling machine, a transmission and control mechanism including a rate changer providing a plurality of groups of rate change members, said groups each including a plurality of shiftable rate change members each shiftable independently of the shifting of the members of the other group, a plurality of shifting devices each individually and independently operable and respectively connected for shifting the members of different of said groups in predetermined sequence, a rate indicating device including a rotatably mounted chart having indices collectively indicating the various rate change effects of both said groups and an indicator pivotally mounted concentric with and angularly movable relative to said chart, and a plurality of motion transmitting connections respectively connected for movement in accordance with different of said shifting devices and respectively connected to move said chart and said indicator in manner to indicate on said chart the speed resulting from the combined effect of said groups of rate change members.

6. In a milling machine having a column, a rotatable spindle carried by said column, and means for driving said spindle; the combination with a speed changing transmission mechanism operatively connecting said driving means to said spindle and including a primary rate changer having three positions for effecting three speed ranges and a secondary rate changer having a plurality of positions for effecting a plurality of speed rates, said rate changers being arranged in series relation in said transmission mechanism in manner to cooperate in effecting spindle speed changes; of a primary shifting lever rotatably mounted on said column and connected to operate said primary rate changer, said lever having three positions spaced at one hundred twenty degrees corresponding to the three ranges effected by said primary rate changer, an annular chart fixed with said primary shifting lever concentric therewith and presenting serially arranged indicia corresponding with the total number of speed rates of said transmission, a secondary shifting lever connected to operate said secondary rate changer, and an indicator disposed in cooperating relation with said indicia chart and operative over a sector of one hundred twenty degrees thereof in response to movement of said secondary shifting lever to indicate on said chart the speed rate resulting from the combined effects of said primary and said secondary rate changers.

7. In an indicator mechanism for a machine tool speed changing transmission, a rotatably mounted crank arm operatively connected to effect adjustment of said transmission for operation in any one of a plurality of speed ranges upon said crank being positioned angularly at any one of a plurality of equally spaced positions, a circular speed chart secured to said crank concentric therewith and presenting indicia representing the speed changes obtainable by means of said transmission arranged in numerical sequence circumferentially thereof, a second crank arm rotatably mounted concentric with said first crank arm and operatively connected to effect adjustment of said transmission for operation at any one of a plurality of speeds included within the speed range to which said transmission is adjusted by said first crank, and a speed indicator operatively associated with said second crank and disposed for angular movement concentric with and in cooperating relation with said circular chart throughout the segment thereof representing the speed range to which said transmission is adjusted in manner to indicate on said chart the speed to which said transmission is adjusted as the combined result of adjusting both said first crank and said second crank.

8. In a machine tool having a supporting base, a rotatable driven member carried by said base, and means for driving said member; the combination with a speed changing transmission mechanism operatively connecting said driving means to said rotatable member for driving said member at a selected one of a plurality of speeds, said mechanism including a primary rate changer operative to effect a plurality of speed ranges and a secondary rate changer operative to effect a plurality of speed rates within any one of the ranges effected by said primary rate changer, said rate changers being serially arranged in said transmission mechanism in manner to cooperate in effecting speed changes; of control mechanism for shifting said rate changers including a primary shifting element rotatably mounted on said base for movement in either direction and connected to operate said primary rate changer, said primary element having a plurality of equally spaced positions corresponding to the plurality of speed ranges effected by said primary rate changer, a rotatable chart operatively connected for movement by said primary shifting element, said chart presenting serially arranged indicia representing the various speeds effected by said transmission mechanism, a secondary shifting element mounted for movement in either direction and connected to operate said secondary rate changer, and an indicator pivotally mounted concentric with said rotatable chart in cooperating relationship with said indicia thereon and operative over a sector thereof corresponding to the range of speed effected by said primary rate changer, said indicator being responsive to movement of said secondary shifting element to indicate on said chart the speed of said rotatable member resulting from the combined effects of said primary and said secondary rate changers.

9. In an indicator mechanism for a machine tool transmission having a first rate changer operable for a number of rate changes of relatively slight difference in rate, and a second rate changer driven through said first rate changer and operable for a number of rate changes of relatively large difference in rate, said rate changers being combinedly operable for a series of speeds including a high rate, a low rate and a number of intermediate rates; the combination in a rate indicating device, of a chart providing indices corresponding to said spindle speeds and arranged in sequential order corresponding to the numerical value of said speeds and an indicator relatively movable adjacent to said chart, a plurality of manually operable levers respectively operable for the adjustment of different of said rate changers and each operable independently of the other, and motion transmitting connections from each of said levers for the relative movement of said chart and indicator in accordance with the rate change effected by movement of the individual lever.

10. In an indicator mechanism for a machine tool transmission having a first rate changer adjustable for nine changes of rate of relatively slight rate difference, and a second rate changer driven through said first rate changer and adjustable for three changes of rate each of greater rate change effect than the total rate change effect of said first rate changer, said rate changers being combinedly operable for twenty-seven rate changes providing a series of speeds of relatively large total range; the combination in a rate indicating device, of a chart providing indices corresponding to said twenty-seven speeds and an indicator relatively movable adjacent to said chart, a plurality of adjusting elements respectively connected for operation of said rate changers, and motion transmitting connections from each of said adjusting elements for effecting relative movement of said chart and indicator, the adjusting element associated with said second rate changer being operatively connected to move said chart to bring any one of three portions thereof into cooperating relation with said indicator and the adjusting element associated with said first rate changer being operatively connected to move said indicator to any one of nine positions relative to said chart, whereby any one of the twenty-seven speeds may be indicated directly on said chart.

11. In an indicator mechanism for a transmission having a first rate changer adjustable for nine changes of rate of relatively slight rate difference and including a group of shafts having mutually parallel axes, and a second rate changer driven through said first rate changer and adjustable for three changes of rate each of greater rate change effect than the total rate change effect of said first rate changer, said second rate changer including shafts axially transverse to the shafts of said group, said rate changers being combinedly operable for twenty-seven rate changes providing a series of speeds of relatively large total range; the combination in a rate indicating device, of a chart having numerals arranged in numerical sequence and corresponding to said speeds and an indicator relatively movable adjacent to said chart, a plurality of manually operable levers respectively operable for the adjustment of different of said rate changers and each operable independently of the other, and motion transmitting connections from each of said levers for the relative movement of said chart and indicator in accordance with the rate change effected by movement of the individual lever.

12. Indicator mechanism for a machine tool speed changing transmission, comprising a rotatably mounted crank arm operative to effect adjustment of said transmission for operation in any one of a plurality of speed ranges and disposed to be positioned angularly in any one of a plurality of equally spaced positions representing said speed ranges, a circular chart mounted to rotate co-axially with said crank and presenting indicia representing the various speed changes which may be effected by said transmission arranged in ranges corresponding to the various positions of said crank, a lever mounted co-axially with said crank and operatively connected to effect adjustment of said transmission for operation at any one of a plurality of speeds within the speed range to which said transmission is adjusted by said crank, and a speed indicator disposed for angular movement co-axially with and in cooperating relation with said circular chart throughout the range thereof corresponding to the speed range to which said transmission is adjusted, said indicator being responsive to movement of said lever to indicate on said chart the speed rate resulting from the adjustment effected by both said crank and said lever.

13. An indicator mechanism for a machine tool speed changing transmission, comprising a rotatably mounted crank operatively connected to actuate a part of said transmission and arranged to be positioned angularly at a plurality of equally spaced positions representing various ranges of speeds for said transmission, a circular speed indicating chart attached to and rotatable concentrically with said crank and presenting indicia representing the several speed rates of which said transmission is capable arranged thereon according to said speed ranges, a lever operatively connected to actuate another part of said transmission through a range of speed changes, and an indicator disposed for angular movement relative to said circular chart throughout one range of indicia thereon to indicate on said chart the speed resulting from the combined actions of said several parts of said speed changing transmission.

14. An indicating device for a speed changing transmission mechanism having two co-axially rotatably mounted adjusting levers, comprising a concentric circular speed chart carried by one of said levers for rotation therewith, and a cooperating indicator rotatably mounted concentric with and adjacent to said chart and operatively connected to said other lever, whereby any adjustment of said transmission effected by moving either or both of said co-axial levers is directly indicated on said chart by said indicator.

15. In an indicator mechanism for a machine tool speed changing transmission having a primary rate changer operative to effect a plurality of speed ranges and a secondary rate changer operative to effect a plurality of speed rates within any one of said ranges; the combination with a primary shifting element connected to shift said primary rate changer to a plurality of positions corresponding to said speed ranges and a speed indicating chart presenting sequentially arranged indicia representing the various speeds effected by said transmission mechanism and operatively connected for movement by said primary shifting element to present groups of said indicia corresponding to the ranges of speed effected by said primary rate changer, of a secondary shifting element connected to shift said secondary rate changer through the range of speeds determined by said primary rate changer, and an indicator mounted in cooperating relationship with said chart and movable in response to movement of said secondary shifting element over the presented group of indicia on said chart to indicate the speed resulting from the combined effects of said primary and said secondary rate changers.

JOSEPH B. ARMITAGE.